July 2, 1968           G. ROUVALIS           3,390,694

POSITION CONTROL APPARATUS

Filed March 25, 1964                          2 Sheets-Sheet 1

WITNESSES
Theodore T. Wrobel
James F. Young

INVENTOR
George Rouvalis
BY [signature]
ATTORNEY

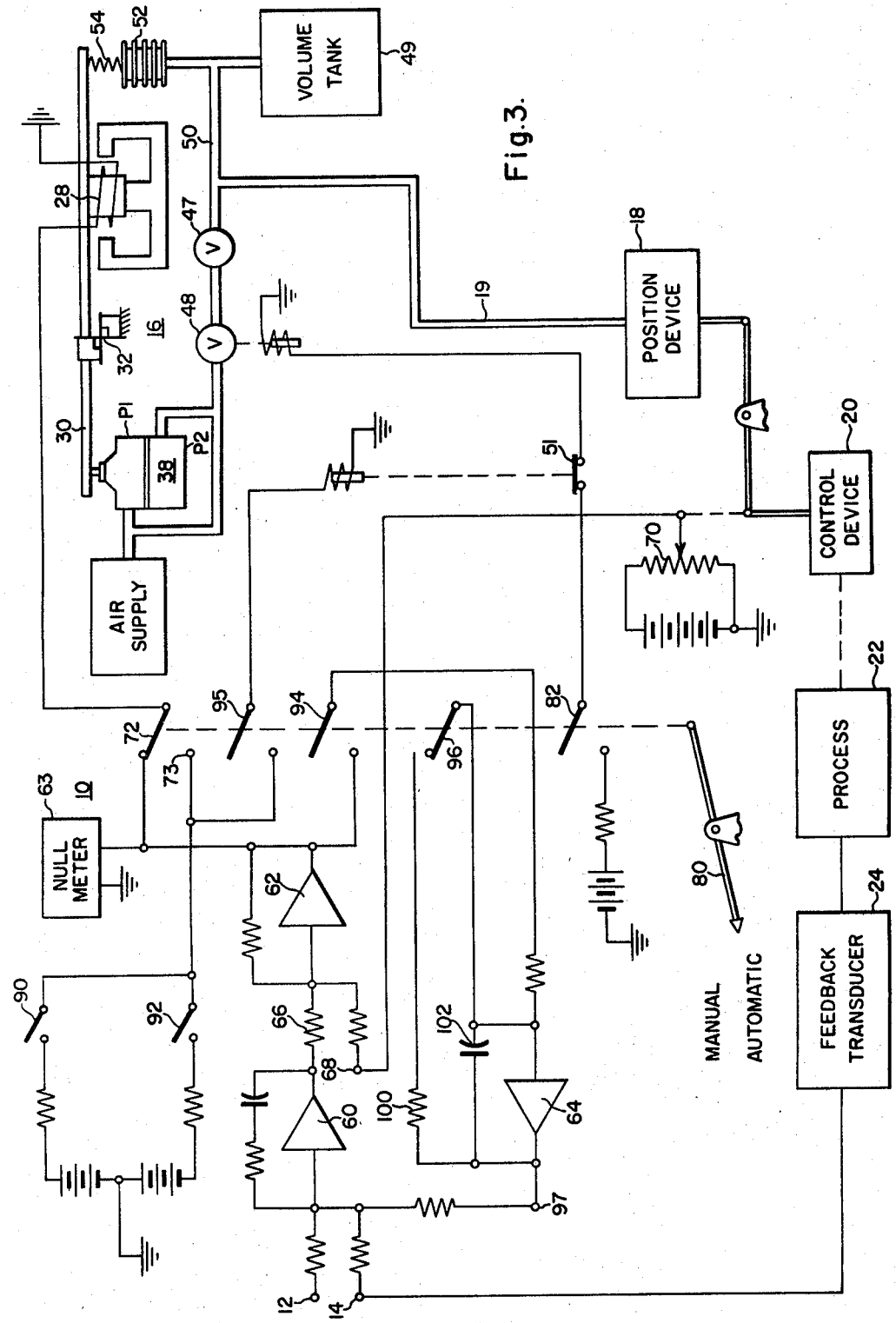

United States Patent Office 3,390,694
Patented July 2, 1968

3,390,694
POSITION CONTROL APPARATUS
George Rouvalis, Mount Lebanon, Pa., assignor to Hagan Controls Corporation, Pittsburgh, Pa., a corporation of Delaware
Filed Mar. 25, 1964, Ser. No. 354,581
5 Claims. (Cl. 137—85)

ABSTRACT OF THE DISCLOSURE

In accordance with the present invention, a position control apparatus is provided which is operative in at least each of a manual mode and an automatic mode such that a bumpless transfer therebetween can be effected; said position control apparatus includes a signal memory function element which is isolated upon transfer from automatic mode to the manual mode of operation and a signal amplifier circuit operative upon subsequent transfer from manual mode back to the automatic mode to gradually cause the process actual operation feedback signal to correspond to the now provided desired set point signal. A position reference signal is provided by a first amplifier responsive to the desired set point signal and the process actual operation feedback signal, a position error signal is provided by a second amplifier responsive to the position reference signal and the output position device actual position feedback signal, and a third amplifier is operative as a signal tracking amplifier during manual mode of operation to provide another input signal to the first amplifier in accordance with manual changes and operative upon transfer back to automatic mode of operation to gradually adjust the position of the output position device in accordance with the now provided desired set point signal.

---

Figure 1:
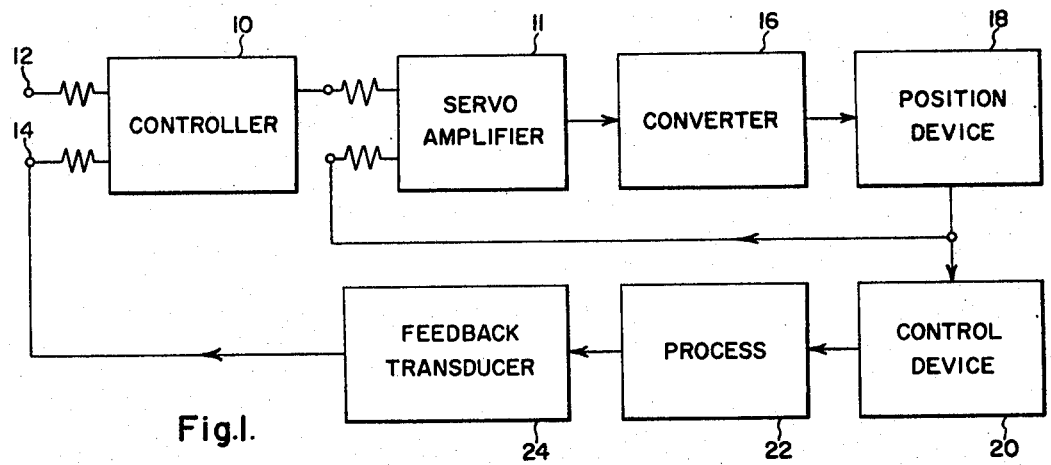

The present invention relates in general to control apparatus, and more particularly to control apparatus operative in each of a manual mode and an automatic mode, with the ability to effect a bumpless transfer in operation therebetween from manual to automatic as well as from automatic to manual as may be desired.

It has been known in the operation of a position control system, to provide a signal converter such as an electric motor to position an output device in response to a first input signal and couple thereto a feedback signal providing element, such as a potentiometer having a tap that is moved in position in conjunction with the desired and controlled movement of this output device, to send back a second signal to the input of the position control system to neutralize any first desired position input signal that caused a movement of the output device. This is a conventional and well known closed loop feedback servo control system. One such signal converter has been a pneumatic device including a pivotally supported balance bar that is subjected to a first torque as a function of the above first desired position input signal and a second and balancing torque as a function of a feedback signal in accordance with the resulting generated pressure supplied to the output position device.

With the advent of automatic control systems, automatically operative for example in response to a computer provided first desired position input signal, there occurs the necessity for maintenance, emergency or other reasons of periodic manual control of the movement of the output position device by means of a manually adjusted signal source such as a switch. The transfer of control from the automatic mode of control apparatus operation to the manual mode and from the manual mode of control apparatus operation to the automatic mode has in the past been difficult to effect without a bump or sudden change in the resulting movement of the output position device.

Accordingly, it is an object of this invention to provide an improved control apparatus that is better operative to effect a bumpless transfer between the manual and the automatic modes of operation with less sudden change in the controlled system, and in addition is more readily adapted for operation in parallel with similar control apparatus.

It is another object to provide an improved pneumatic converter system having a memory function to enable it to effect a bumpless transition between operation in response to an automatically provided signal as compared to operation in response to a manually provided input signal when part of that position control system.

In accordance with the teachings of the present invention, a control device position control apparatus is provided including a signal converter responsive to a position error signal to produce an output signal P2 which is supplied to an output position device operative with a controlled process such as a furnace damper or the like. A signal memory element is included for the signal converter to provide a positive feedback effect at selected times. In this manner a small change in position error signal energization of the signal converter will produce a large change in the output signal P2. Since the signal converter has a high gain, the position error signal is maintained very close to zero for all positions of the output position device.

When the control apparatus is switched to its manual stand-by mode of operation, the memory element is isolated to block the supply of output force signal P2 to the feedback capsule and in addition disconnects the provided position error signal from the torque coil. Thusly, no change in the output force signal results since the position error signal was allowed to become zero prior to switching from automatic to manual stand-by mode. The output force signal P2 will remain at the value within the memory element and the output position device will remain constant.

During a manual change of the operation, one of a manually controlled position increase signal or position decrease signal is applied to the signal converter and in this way the output force signal P2 is varied as desired.

When it is desired to again change from manual to automatic operation, the position error signal is allowed to become zero in value and can be again connected to the signal converter without effecting a change in the output force signal P2. The memory element is now again connected to the output force signal P2.

Figure 2:
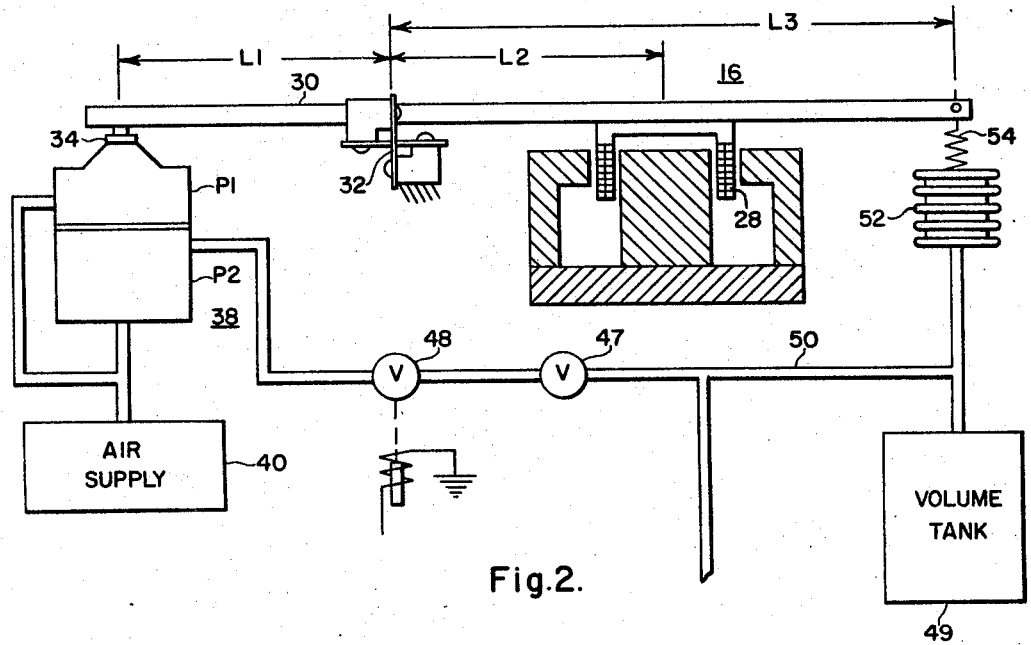

These and other objects and advantages of the present invention will become apparent in view of the following description taken in conjunction with the drawings, wherein:

FIGURE 1 is a diagrammatic showing of the present control apparatus;
FIG. 2 is a schematic showing of the force signal converter device; and
FIG. 3 is a schematic showing of the present control apparatus.

In FIG. 1 there is shown a controller 10 which can include a functional amplifier operative as a well known proportional plus integral device. A first signal input 12 is provided to receive a set point or desired pressure signal from a computer or suitable signal providing device. A second signal input 14 is provided to receive an actual controlled variable or pressure feedback signal. Any difference between the set point signal and the feedback signal is supplied to a servo amplifier 11 as a position reference signal. The servo amplifier 11 now compares the position reference signal with an actual position feedback signal to generate a position error signal that is supplied to a signal converter 16, which can be operative to convert the electrical position error signal into a pneumatic force signal that is supplied to a position device 18 for varying the position of a control device 20 as necessary to effect the desired operation of a controlled process 22 in accordance with the set point signal supplied to the input 12. A feedback transducer 24 which may be a pressure transducer or the like, supplies an actual pressure or operation feedback signal to the input 14 in accordance with the actual operation of the process 22.

In FIG. 2 there is illustrated one form of a suitable signal converter device 16, including a torque coil 28 operative to receive the position error signal for example from the servo amplifier 11 shown in FIG. 1. A balance arm 30 is pivotally supported at 32 and includes a variable flapper nozzle 34 operative with a conventional and well known pneumatic booster device 38 operative to receive air from an air supply 40 such that the position of the nozzle member 34 provides a first force F1 in accordance with the air pressure within the booster 38 times the effective nozzle area of the flapper nozzle 34 to provide a torque T1 to the balance arm 30 in accordance with the distance L1 times this force F1. This torque T1 is in opposition to a torque T2 determined by the force F2 provided by energization of the torque coil 28 with the position error signal times the arm L2 relative to the pivot 32. Movement of the flapper nozzle 34 varies the pressure P2 as the output force signal from the converter 16. A needle valve 47 and a solenoid valve 48 are provided in a passage 50 connected between the booster 38 and a bellows feedback capsule 52 for providing a positive feedback force F3 to the balance arm 30. A suitable volume tank 49 is operative with the conduit 50 in conjunction with the needle valve 47 for stabilization purposes. Expansion of the bellows 52 is operative through a compression spring 54 to provide the force F3 to the balance arm 30 for providing a torque T3 in accordance with the product of the force F3 times the distance L3 relative to the pivot 32.

With the solenoid valve 48 open, the signal converter 16 has positive feedback by way of the bellows capsule 52 and spring 54 such that a small change in energization of the torque coil 28 will produce a large change in the output force signal P2. It performs as a high gain controller operative in accordance with the integral of the position error signal supplied to the coil 28.

In FIG. 3 there is shown the controller 10 including a proportional plus integral function amplifier 60, a proportional servo amplifier 62 and an integrating tracking amplifier 64. The desired pressure or set point signal is supplied to input 12 and the actual pressure feedback signal is supplied to input 14, such that the amplifier 60 provides a position reference signal in accordance with the proportional plus integrated difference between the respective signals supplied to inputs 12 and 14. The position reference output signal from the amplifier 60 is supplied to the proportional amplifier 62 through a resistor 66. An actual position second feedback signal is supplied through input 68 in accordance with the actual position of the output position device 18 and control device 20 as supplied through movement of the contact arm of a potentiometer 70. The servo amplifier 62 provides the position error signal through a switch 72 to the torque coil 28 of the signal converter 16. This causes a movement of the balance arm 30 about pivot 32 such that the pneumatic booster 38 effects a change in the output force signal P2 supplied to the position device 18 as required to correct this error in the position of the control device 20.

The manual to automatic control member 80 is shown in its automatic mode position such that the switch 82 is open and the solenoid valve 48 is not energized to thereby provide an open passage for the output force signal P2 through the conduit 50 to the bellows capsule 52 for providing a positive feedback torque T3 to the balance arm 30.

A different set point signal applied to input 12 will change the position reference signal from the amplifier 60 to cause the signal converter 16 to vary the output force signal P2 supplied to the position device 18 through conduit 19 to effect the desired change in the movement of a control device 20 such as a damper operative with the controlled process 22 such as a furnace. A measured draft pressure or other operation sensing parameter of the furnace process 22 is converted by the feedback transducer 24 into an actual pressure feedback signal and supplied to the input 14 to match this new set point signal. Movement of the control device 20 provides an actual position feedback signal to the terminal 68 to substantially balance and neutralize the position reference signal from the amplifier 60. The proportional amplifier 62 now provides a zero position error signal through the switch 72. The torque coil 28 at this time is not energized due to the zero position error signal and the balance arm 30 is in a stable and balanced position.

If it is desired to transfer the control of the process 22 to manual operation, the control member 80 is moved into its manual stand-by position to close the switch 82 and the switch 72. The position increase manual switch 90 and the position decrease manual switch 92 are now operative through the switch 72 to control the energization of the torque coil 28. The closing of the switch 82 energizes the solenoid valve 48 to close the latter valve and disconnect the conduit 50 from the output force signal P2 from the booster 38. The switch 94 is closed by movement of the control member 80 to its manual position and the switch 96 is opened.

Closing of one of the manual control switches 90 or 92, for example the position increase manual control switch 90 energizes a relay 51 connected to open the circuit between the switch 82 and the solenoid valve 48 and energizes the torque coil 28 to vary the output force signal P2 through operation of the pneumatic booster 38 such that the position device 18 changes the position of the damper control device 20 to cause the furnace process 22 to change its operation and thereby operate through the pressure feedback transducer 24 to provide a desired pressure feedback signal through the input 14 to the controller amplifier 60.

With the switch 94 closed in manual stand-by location of control member 80 the position error signal from the amplifier 62 is connected through the tracking amplifier 64 to a third input 97 of the functional amplifier 60. The amplifier 60 will change its output until the input signals supplied to its respective three inputs neutralize each other and hence a zero difference is sensed. In this respect any difference between the set point signal supplied to input 12 and the feedback signal supplied to input 14, which latter signal will change due to manual variation of the damper control device 18 through closing of one of switches 90 or 92, will be neutralized and made up by the output signal from the tracking amplifier 64 supplied to the input 97. For example, if the set point signal supplied to input 12 is +5 volts and through the closing of the increase position switch 90 the actual feedback signal supplied to input 14 becomes minus 3 volts, the tracking amplifier 64 will operate to supply the neutralizing minus 2 volts to the input 97. The output signal from the amplifier 60 will have to match the actual position feedback signal supplied to terminal 68 to cause the servo amplifier 62 to have a zero position error signal. This satisfies the integrator amplifier 64 to stabilize the controller 10.

If it is now desired to transfer operation of the control apparatus back to automatic operation, when the null meter 63 visually indicates that the position error signal is zero, the control member 80 is moved to its illustrated position for automatic mode of operation, and the switch 72 again connects the position error signal from the proportional amplifier 62 to the torque coil 28 of the converter 16. Since the position error output signal at this time from the proportional amplifier 62 is zero, this does not cause a change in the operation of the balance arm 30. Movement of the control member 80 to its automatic position opened the switch 82 to deenergize the solenoid volve 48 which then opens to again connect the conduit 50 to the output pressure signal from the booster 38.

A movement of the balance arm 30 varies the output force signal P2 through operation of the pneumatic booster 38 such that the position device 18 changes the position of the damper control device 20 as necessary to gradually change the value of the feedback signal supplied through the input 14 to a value corresponding to the set point signal supplied through the input 12. Automatic control of the damper control device 20 can be now effected. Closing of the switch 96 connects the resistor 100 to shunt the integrating capacitor 102 of the tracking amplifier 64 and in a predetermined time delay determined by the components of the provided discharge circuit the output signal from the tracking amplifier 64 will become zero in accordance with the discharge of the capacitor 102 to slowly adjust the position of the control device 20 relative to the desired pressure or set point signal supplied through the input 12.

In the operation of the converter 16 shown in FIG. 2, the balance arm 30 is held in a stable and balanced position by the application of a torque T2 which is zero in value when the torque coil 28 is not energized and a torque T1 determined by the pressure within the booster 38 times the effective nozzle area of the flapper nozzle 34 in opposition to a third torque T3 supplied by the output force signal P2 supplied through the conduit 50 to the capsule 52 and acting through the compression spring 54. An initial stable balance is effected when the error signal supplied to the torque coil 28 is zero and the torque T1 balances the torque T3. At this time the output force signal P2 substantially equals the pressure P3 within the capsule 52. When the controller 10 provides an error signal to energize the torque coil 28, this unbalances the arm 30 and correspondingly varies the pressure P2 through the resulting position change of the flapper nozzle 34. This new value of output force signal or pressure P2 is supplied through the open solenoid valve 48 and the conduit 50 to the capsule 52 to provide a new torque T3 which when added to the torque T2 resulting from energization of the torque coil 28 is effective to balance the torque T1 resulting from the pressure within the booster 38 acting against the flapper nozzle 34.

Thusly, transfer of the control apparatus from automatic to manual operation can be effected without a sudden bump any time that the position error signal supplied to the torque coil 28 has a zero value. At that time the torque T3 is balanced by the torque T1 without benefit of the torque T2 resulting from the torque coil 28. For convenience, a null meter 63 senses when the position error signal is zero and this transfer can be effected in this way.

In the operation of the control apparatus shown in FIG. 3, when the control member 80 is in its automatic mode position as shown the switch 94 is open and the tracking amplifier 64 has a zero output signal supplied to the terminal 97 and the switch 72 connects the output position error signal of the proportional amplifier 62 to energize the torque coil 28 of the signal converter 16. Any difference between the desired set point signal supplied to the input 12 and the actual operation feedback signal supplied to the input 14 results in a proportional plus intergrated position reference signal from the amplifier 60. The latter signal is matched with an actual position signal from the potentiometer 70, such that the proportional amplifier 62 provides a position error signal through the switch 72 to energize the torque coil 28. This determines the position of the balance arm 30 to operate through the pneumatic booster 38 to provide a corresponding value of output force signal P2 through conduit 19 to a position device 18 for controlling the position of a damper control device 20 which in turn controls the operation of the furnace process 22 as necessary to provide from the feedback transducer 24 an actual operation feedback signal to neutralize the desired operation set point signal supplied to the input 12.

Changes in the value of the set point signal as supplied to the input 12 cause a variance in the position of the balance arm 30 to correspondingly change the output force signal P2 from the pneumatic booster 38 as required to vary the operation of the process 22 to provide through the feedback transducer 24 an actual operation feedback signal to balance and neutralize the set point signal.

If it is desired to change the operation of the control apparatus from automatic to manual stand-by mode of operation, the control member 80 is shifted into its manual location to open the switch 96 and to close the switches 82, 94 and 95. Also switch 72 is connected to terminal 73 to permit either of the manual switches 90 or 92 when closed to be operative through the switch 72 to energize the torque coil 28. The solenoid valve 48 is energized and thereby closed through the switch 82, until the relay 51 is energized through switch 95 to deenergize and open the solenoid valve 48.

Since the position error signal from the proportional amplifier 62 is maintained substantially at zero value through operation of the control apparatus shown in FIG. 3, the transfer from automatic to manual can be practically made at any time to effect a bumpless transfer to the manual mode of operation with no abrupt change in the operation of the position device 18. The null meter 63 gives an indication of the value of the position error signal and can be utilized to be certain that a zero position error signal is present at the time of making this transfer. If it is desired to increase the position of the position device 18, the manual switch 90 can be closed as required to do this. On the other hand if it is desired to decrease the position of the position device 18, the manual switch 92 can be closed for this purpose. Any changes by the position device 18 and the control device 20 are sensed through operation of the feedback transducer 24 as a different value of actual feedbank signal supplied through the input 14. This varies the output signal from the amplifier 60 and the position error signal from the proportional amplifier 62 to energize through the closed switch 94 during manual operation the tracking amplifier 64 operative now as an integrated amplifier to provide an output signal to input 97 as required to match and neutralize the three signals applied to the respective inputs 12, 14 and 97, with the tracking amplifier 64 supplying the necessary signal make up or difference required in this regard.

With the solenoid valve 48 closed, the conduit 50 and capsule 52 trap the output force signal P2 as an operation reference signal at its value at the time that transfer to manual mode of operation was effected.

When it is desired to change back to the automatic mode of operation, the control member 80 is moved to its automatic location as shown in FIG. 3. This closes the switch 96 and starts the gradual discharging of the capacitor 102 through the resistor 100. The switches 94 and 95 are opened and the switch 72 is moved in position such that the error signal from the proportional amplifier 62 is now connected to energize the torque coil 28 of the converter 16. The switch 82 is moved to deenergize the solenoid valve 48 and again connect the capsule 52 to the output force signal P2. There is a zero error signal at this time provided by the proportional amplifier 62 due to the integral operation of the tracking amplifier 64.

If the position of the position device 18 at the time of transfer to the automatic mode of operation is not the same as the desired set point signal supplied to the input 12, the actual feedback signal supplied to the input 14 will be different than the desired set point signal supplied to the input 12. A bump or rapid change in the position of the position device 18 will not be effected but instead the gradual discharge of the capacitor 102 will result in a decrease to zero in the signal supplied by the tracking amplifier such that a gradual change in the error signal from the proportional amplifier 62 will be supplied through the switch 72 to the torque coil 28 to result in a gradual change in the output force signal P2 for correcting this difference and causing the actual feedback signal supplied through the input 14 to correspond to the desired set point signal supplied through the input 12 when the signal from the tracking amplifier 64 reaches a zero value.

Thusly, it will be seen that the control signal supplied to the torque coil 28 of the converter 16 as supplied by the proportional servo amplifier 62 is in effect the amplified difference between the position reference signal from the amplifier 60 and the actual position feedback signal from the potentiometer 70.

The signal converter 16 has positive feedback and operates as a high gain integrating device such that small changes in the signal supplied to the torque coil 28 will produce large changes in the output force signal P2 from the pneumatic booster 38. The position 18 is a conventional and well known pneumatic power positioner and has a power cylinder and its own feedback such that for every value of force signal P2 there will be a particular position of the power cylinder within the position device 18. The signal converter 16 has sufficient gain to result in the error signal from the proportional servo amplifier 62 being held very close to zero for all position of the cylinder within the position device 18.

As shown in FIG. 2, the clockwise torque T1 applied to the balance arm 30 is produced by the pressure within the booster 38 times the area of the flapper nozzle 34 and the lever arm L1 relative to the support pivot 32 and is balanced by the torque T3 of the positive feedback capsule 52 and spring 54 operating through the lever arm L3 relative to the support pivot 32. The pneumatic booster 38 is a well known and conventional device to produce an output force signal P2 as a predetermined function of the energization of the torque coil 28.

In case of electrical power failure, or when it is desirable to switch to the manual mode of operation, the solenoid valve 48 is closed by suitable switch circuits to seal the pressure in the positive feedback capsule 52. No change in torque applied to the balance arm 30 is thereby produced and the pressure P2 will be maintained at the value of the trapped air pressure within the capsule 52. However, the position of the cylinder within the position device 18 still can be changed by energization of the torque coil 28 in the proper polarity to provide an additional torque T2 acting through the lever arm L2 relative to the support pivot 32 for adjusting the output force signal P2 supplied by the pneumatic booster 38.

The inclusion of the servo amplifier 11 facilitates the parallel operation of a plurality of control apparatus shown in FIG. 1. More specifically, in the control of a process having a plurality of controlled variable determining devices, such as a plurality of air flow dampers operative with a furnace, the position reference signal from the controller 10 can be supplied to a like plurality of servo amplifiers 11, with a different such amplifier being provided for the respective damper devices, and each such servo amplifier is connected to provide an individual position error signal for its respective damper device. This permits the most effective control of the furnace process by selective operation of all of the dampers or less depending upon the desired operation of the furnace.

The present invention is related to the invention covered in abandoned patent application Ser. No. 354,544, filed Mar. 25, 1964, by the same inventor and assigned to the same assignee Although the present invention has been described with a certain degree of particularity it should be understood that the present disclosure has been made only by way of example and that numerous changes in the details of construction and the combination and arrangement of parts may be resorted to without departing from the scope and spirit of the present invention.

I claim as my invention:

1. In control apparatus responsive to a set point input signal and operative with a process in one of a first mode and a second mode of operation to vary the position of a process control device, the combination of operation sensing means responsive to said set point input signal and responsive to the operation of said process to provide a position reference signal, position error sensing means responsive to said position reference signal and the actual position of said control device to provide a position error signal, a signal converter operative with said position error signal and connected to said control device for providing a control signal to determine the position of said control device, said signal converter including a feedback connection for said control signal, and mode selection means connected between said position error sensing means and said signal converter and operative with said feedback connection to provide a first predetermined operation of the signal converter during said first mode and to provide a second predetermined operation of the signal converter during said second mode.

2. In control apparatus for positioning a control device in accordance with a set point input signal in a plurality of operating modes, the combination of first signal feedback means connected to the control device for providing an actual position signal, signal controller means responsive to each of the actual position signal and the set point input signal to provide a position control signal, signal converter means responsive to said position control signal for providing an output positioning signal, with said converter means including a signal memory connection operative with said converter means to retain a predetermined value of said output positioning signal, mode selection means having a first mode selecting position wherein said signal converter means is responsive to said position control sgnal and said predetermined value of the positioning signal is not retained and having a second mode selecting position wherein said signal converter means is not responsive to said position control signal and said predetermined value of the positioning signal is retained for operation with the signal converter means.

3. In control apparatus operative in one of a plurality of modes relative to an input reference signal for controlling the position of a control device and thereby the operation of a process, the combination of operation sensing means for providing a process variable feedback signal, operation control means responsive to said input reference signal and said process variable feedback signal to provide a position reference signal, position control means responsive to said position reference signal, position signal providing means operative with said control device and connected to said position control means for providing an actual position feedback signal to said position control means to provide a position error signal to vary the position of said control device in accordance with the value of said error signal, fluid signal means responsive to said error signal to control the value of an output fluid control signal, mode selection means operative with said position control means and with said fluid signal means to provide a first mode selection wherein said error signal is supplied to the fluid signal means and to provide a second mode selection wherein said error signal is not supplied to the fluid signal means, said fluid signal means including signal memory means for providing a predetermined previous value of said fluid control signal to said fluid signal means during operation in one of said mode selections.

4. In control apparatus operative in one of a manual mode and an automatic mode in response to an input reference signal for positioning a control device, the combination of signal transducer means connected to said control device for providing a feedback signal in accordance with the actual position of said control device, signal controller means responsive to each of said reference signal and said feedback signal to provide a position error signal, signal converter means operative to provide an output fluid force signal to change the position of said control device, said signal converter means including first control means responsive to said position error signal for controlling said output fluid force signal, said signal converter means including second control means responsive to said output fluid force signal during said automatic mode and to a predetermined value of said output fluid force signal during said manual mode for controlling said output fluid force signal, signal integrator means operative as a signal time integral device, and mode selection switch means being operative with said first control means to disconnect said position error signal from said first control means during said manual mode and being operative with said controller means to connect said signal integrator means around said controller means during said manual mode to compensate for any difference between the reference signal and said feedback signal resulting from the positioning of the control device.

5. In position control apparatus for a movable control device, said apparatus being operative with one of a desired position signal and a manual control signal, the combination of position transducer means operative with said control device to provide an actual position feedback signal, signal generator means responsive to said desired position signal and to said feedback signal to provide a position error signal, signal converter means operative to provide a fluid output force signal to move said control device, said signal converter means including fluid signal memory means operative to provide a reference fluid force signal for controlling the operation of said converter means, and mode selection means operable in a first manner to connect said position error signal to said converter means to determine the fluid output force signal in accordance with said error signal, said mode selection means being operable in a second manner to connect said manual control signal to said converter means and to cause the signal memory means to provide said reference force signal to said converter means when said manual control signal is not requesting a change in the position of said control device.

References Cited

UNITED STATES PATENTS

| | | | |
|---|---|---|---|
| 2,747,595 | 5/1956 | Dickey | 137 |
| 2,852,197 | 9/1958 | Virbila | 251—26 |
| 2,949,273 | 8/1960 | Roper et al. | 251—26 |
| 3,015,768 | 1/1962 | Hornfeck et al. | 91—363 |

H. CARY NELSON, *Primary Examiner.*

ARNOLD ROSENTHAL, *Examiner.*